(12) United States Patent
Dolan et al.

(10) Patent No.: US 10,444,981 B2
(45) Date of Patent: *Oct. 15, 2019

(54) DIGITAL-MARKING-SURFACE SPACE AND DISPLAY MANAGEMENT

(71) Applicant: SHARP KABUSHIKI KAISHA, Sakai (JP)

(72) Inventors: John Dolan, Vancouver, WA (US); Dana Smith, Dana Point, CA (US); Stephen Ellis, Portland, OR (US)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 257 days.

This patent is subject to a terminal disclaimer.

(21) Appl. No.: 15/189,078

(22) Filed: Jun. 22, 2016

(65) Prior Publication Data

US 2016/0306544 A1   Oct. 20, 2016

Related U.S. Application Data

(62) Division of application No. 13/430,582, filed on Mar. 26, 2012, now Pat. No. 9,400,592.

(51) Int. Cl.
*G06F 3/041* (2006.01)
*G06F 3/0488* (2013.01)
*G06F 3/0483* (2013.01)
*G06F 3/0484* (2013.01)

(52) U.S. Cl.
CPC ........ *G06F 3/04883* (2013.01); *G06F 3/0483* (2013.01); *G06F 3/04845* (2013.01); *G06F 3/04886* (2013.01); *G06F 2203/04803* (2013.01)

(58) Field of Classification Search
CPC ......... G06F 2203/04803; G06F 3/0483; G06F 3/04845; G06F 3/04883; G06F 3/04886
See application file for complete search history.

(56) References Cited

U.S. PATENT DOCUMENTS

| | | | |
|---|---|---|---|
| 2002/0008692 A1* | 1/2002 | Omura | G06F 1/16 345/173 |
| 2009/0249235 A1* | 10/2009 | Kim | G06F 3/0481 715/765 |

* cited by examiner

*Primary Examiner* — Insa Sadio
(74) *Attorney, Agent, or Firm* — ScienBiziP, P.C.

(57) ABSTRACT

Aspects of the present invention are related to systems, methods and apparatus for digital-marking-surface spatial management of content units and display of content units. Some aspects relate to diagrammatic gestures that invoke content-unit spatial separation on a digital marking surface. Some aspects relate to the generation and display of a transformed view of content units on a digital marking surface.

10 Claims, 11 Drawing Sheets

DIGITAL-MARKING-SURFACE SPACE AND DISPLAY MANAGEMENT

RELATED APPLICATIONS

This application is a Divisional of an application entitled, METHODS, SYSTEM AND APPARATUS FOR DIGITAL-MARKING-SURFACE SPACE AND DISPLAY MANAGEMENT, Ser. No. 13/430,582, filed Mar. 26, 2012.

FIELD OF THE INVENTION

Aspects of the present invention relate generally to a digital-marking-surface method, system and apparatus, and more particularly, aspects of the present invention relate to spatial management of content and blank space as displayed on a digital marking surface.

BACKGROUND

A digital-marking-surface apparatus typically comprises a marking surface on which a user may place digital marks and on which other digital content may be displayed. Digital marks may be placed by a user using a pen device, stylus, finger or other marking device or object. Additionally, other digital content, for example, an image, a video window, an application window, content associated with a remote desktop, web content, multimedia content or other digital content may be displayed on a digital marking surface.

One example of a digital-marking-surface apparatus is an electronic whiteboard on which diagrams and text may be drawn and on which other digital content may be displayed. In this type of apparatus, a digital sheet corresponding to a spatial extent associated with the digital marking surface may be larger than the digital marking surface of the actual physical apparatus, and the physical, digital marking surface of the apparatus may be envisioned as a viewport onto the digital sheet.

Often, when using this type of digital marking surface, content may accumulate in the viewport until the viewport is filled. Erasure, or removal of content, may not be desirable since erasure may cause the loss of information and continuity and may detract from a presentation. In this situation, a digital marking surface allowing rearrangement of content without erasure may be desirable.

SUMMARY

Some embodiments of the present invention comprise methods, systems and apparatus for changing the position and orientation of content units on a digital-marking-surface device after the content units have been placed. In some embodiments, a predetermined diagrammatic gesture may be used on the digital marking surface to invoke content-unit spatial separation commands and special display features. In some embodiments, content units may be spatially separated on the digital marking surface in response to a diagrammatic gesture. In some embodiments, spatial separation of the content units may be performed in conjunction with a transformed view of the spatially separated content units.

The foregoing and other objectives, features, and advantages of the invention be more readily understood upon consideration of the following detailed description of the invention taken in conjunction with the accompanying drawings.

BRIEF DESCRIPTION OF THE SEVERAL DRAWINGS

FIG. 1 diagram illustrating an exemplary digital-marking-surface system according to some embodiments of the present invention;

Figure 11A:
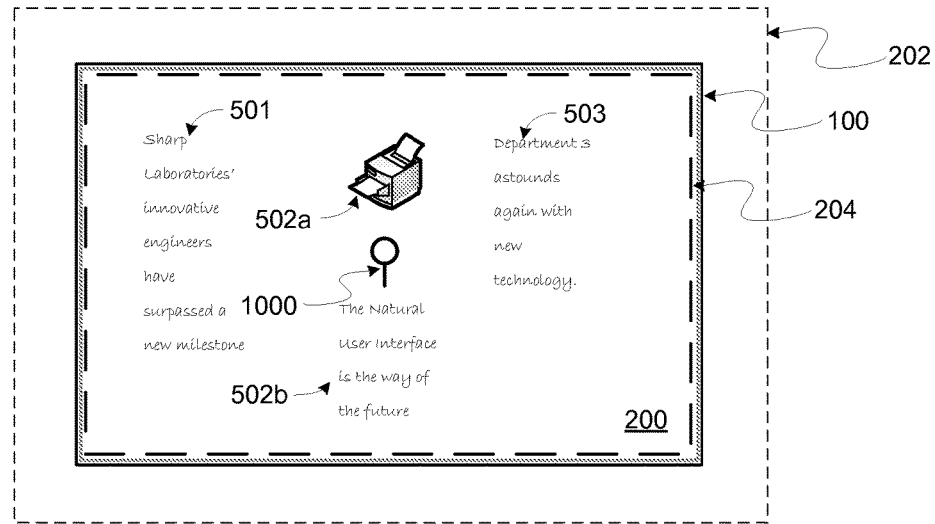
Figure 11B:
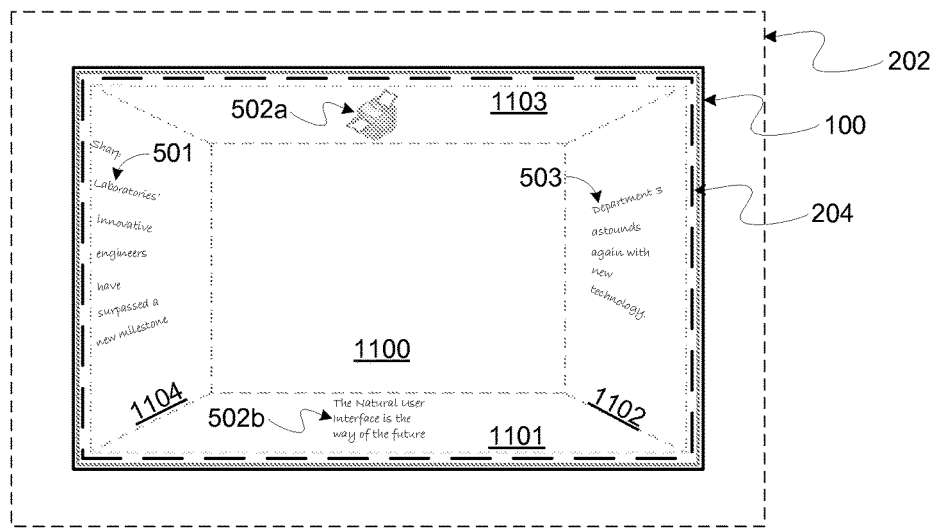

FIG. 11A is a diagram illustrating a digital marking surface with content units and a keyhole gesture shown according to exemplary embodiments of the present invention; and FIG. 11B is a diagram illustrating a digital marking surface with content units spatially separated in two dimensions and displayed in a transformed view in a box pattern according to exemplary embodiments of the present invention.

DETAILED DESCRIPTION OF EXEMPLARY EMBODIMENTS

Embodiments of the present invention will be best understood by reference to the drawings, wherein like parts are designated by like numerals throughout. The figures listed above are expressly incorporated as part of this detailed description.

It will be readily understood that the components of the present invention, as generally described and illustrated in the figures herein, could be arranged and designed in a wide variety of different configurations. Thus, the following more detailed description of the embodiments of the methods, systems and apparatus of the present invention is not intended to limit the scope of the invention, but it is merely representative of the presently preferred embodiments of the invention.

Elements of embodiments of the present invention may be embodied in hardware, firmware and/or a non-transitory computer program product comprising computer-readable storage medium having instructions stored thereon/in which may be used to program a computing system. While exemplary embodiments revealed herein may only describe one of these forms, it is to be understood that one skilled in the art would be able to effectuate these elements in any of these forms while resting within the scope of the present invention.

Although the charts and diagrams in the figures may show a specific order of execution, it is understood that the order of execution may differ from that which is depicted. For example, the order of execution of the blocks may be changed relative to the shown order. Also, as a further example, two or more blocks shown in succession in a figure may be executed concurrently, or with partial concurrence.

It is understood by those with ordinary skill in the art that a non-transitory computer program product comprising a computer-readable storage medium having instructions stored thereon/in which may be used to program a computing system, hardware and/or firmware may be created by one of ordinary skill in the art to carry out the various logical functions described herein.

A digital-marking-surface apparatus typically comprises a marking surface on which a user may place digital marks and on which other digital content may be displayed. Digital marks may be placed by a user using a pen device, stylus, finger or other marking device or object. Additionally, other digital content, for example, an image, a video window, an application window, content associated with a remote desktop, web content, multimedia content or other digital content may be displayed on a digital marking surface.

One example of a digital-marking-surface apparatus is an electronic whiteboard on which diagrams and text may be drawn and on which other digital content may be displayed. In this type of apparatus, a digital sheet corresponding to a spatial extent associated with the digital marking surface may be larger than the digital marking surface of the actual physical apparatus, and the physical, digital marking surface of the apparatus may be envisioned as a viewport onto the digital sheet.

Often, when using this type of digital marking surface, content may accumulate in the viewport until the viewport is filled. Erasure, or removal of content, may not be desirable since erasure may cause the loss of information and continuity and may detract from a presentation. In this situation, a digital marking surface allowing rearrangement of content without erasure may be desirable.

Basic digital marks may be referred to as basic ink units, and more complex marks, composed of one, or more, basic ink units, may be referred to as compound ink units. For example, a single stroke, a cursive letter or a cursive word may constitute a basic ink unit, while some combination of these ink units, for example, a word, sentence, paragraph or other combination may constitute a compound ink unit. An ink unit or an encapsulated object associated with other digital content may constitute a digital-marking-surface content unit, also referred to as a content unit. Metadata may be associated with a content unit. Exemplary content-unit metadata may include, for example, the type of content unit, a property of the content unit, the origin of the content unit and other content-unit data.

Figure 1:
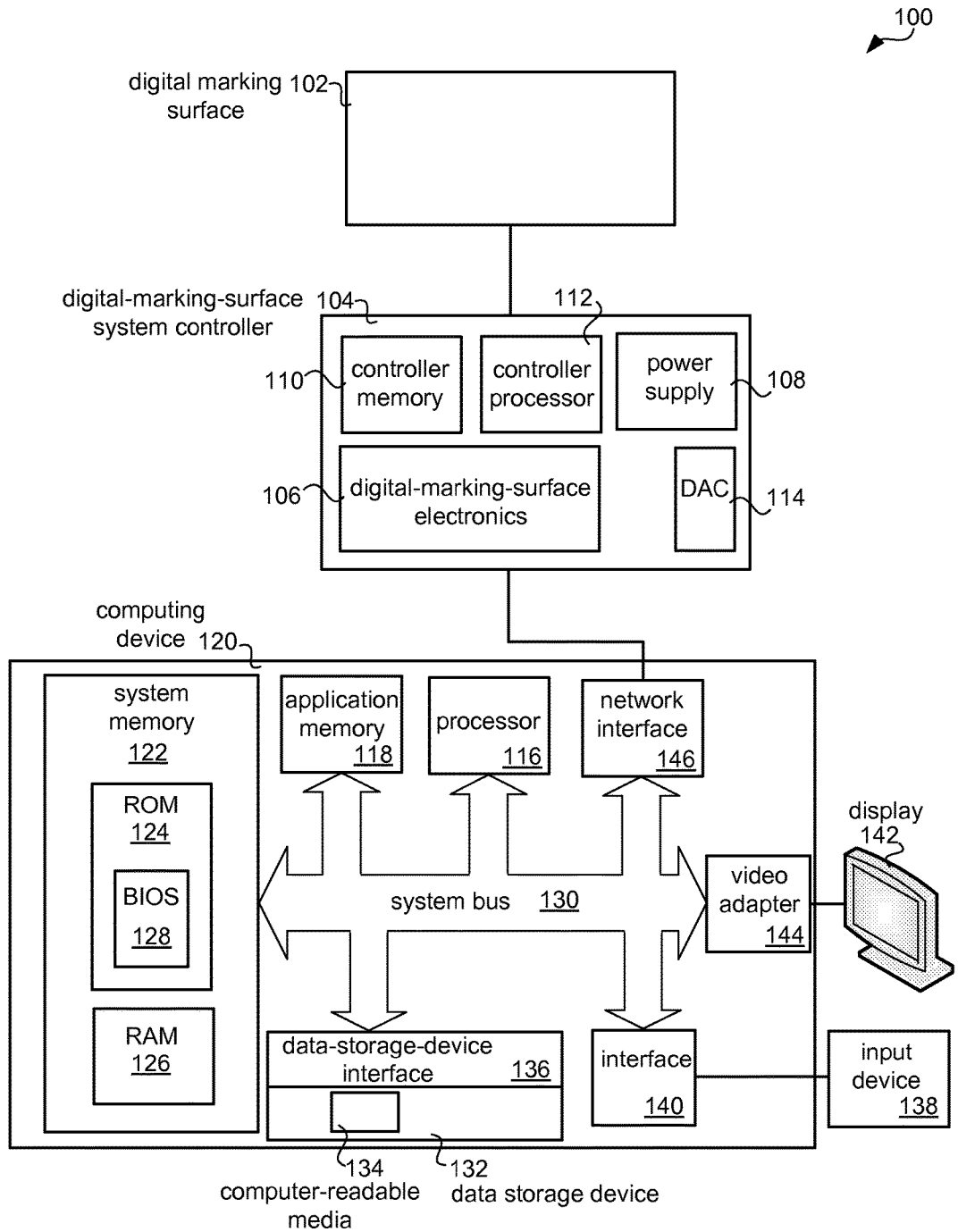

FIG. 1 illustrates an exemplary digital-marking-surface system 100 according to embodiments of the present invention. The digital-marking-surface system 100 may comprise a digital marking surface 102, for example, an interactive whiteboard, a touch-screen device or other digital marking surface. Some embodiments of the present invention may comprise an interactive whiteboard comprising a sensing technology for tracking an interaction on the digital marking surface 102. Exemplary sensing technologies include resistive sensing technologies, capacitive sensing technologies, active electromagnetic sensing technologies, passive electromagnetic sensing technologies, optical sensing technologies, for example, infrared based, laser based, camera based and other optical-based sensing technologies, ultrasonic sensing technologies, dispersive signal technologies and other sensing technologies.

A user may place a digital mark on the digital marking surface 102 using a marking device, for example, a mouse, a keyboard, a stylus, a specialized marking-device pen, a finger or other marking device capable of inputting a digital-ink marking on the digital marking surface 102. The digital marking surface 102 may also display digital images.

The digital-marking-surface system 100 may comprise a digital-marking-surface system controller 104 for controlling the digital-marking-surface system 100. The digital-marking-surface system controller 104 may comprise digital-marking-surface electronics 106 for controlling the digital marking surface 102, for making measurements from the digital marking surface 102 and for other control functions associated with the digital-marking-surface system 100. The digital-marking-surface system controller 104 may comprise a power supply 108, a controller memory 110, a controller processor 112 and a digital-to-analog converter (DAC) 114. In some embodiments of the present invention (not shown), the digital-marking-surface system controller 104 may be physically integrated into a single apparatus with the digital marking surface 102. In alternative embodiments, the digital-marking-surface system controller 104 may be physically separate from, but electronically connected to, the digital marking surface 102.

The digital-marking-surface system 100 may comprise a processor 116 and an application memory 118. In some embodiments of the present invention (not shown), the processor 116 and the application memory 118 may be physically integrated into a single apparatus with the digital marking surface 102. In alternative embodiments of the present invention (not shown), the processor 116 and the application memory 118 may be physically integrated into a single apparatus with the digital-marking-surface system controller 104. In yet alternative embodiments of the present invention, the processor 116 and the application memory 118 may be separate from, but electronically connected to, both the digital marking surface 102 and the digital-marking-surface system controller 104. In some embodiments of the present invention, the processor 116 and application memory 118 may reside in a computing device 120.

An exemplary computing device 120 may comprise system memory 122, which may comprise read-only memory (ROM) 124 and random-access memory (RAM) 126. The exemplary computing device 120 may comprise a basic input/output system (BIOS) 128, which may reside in ROM 124, for controlling the transfer of information between the components of the computing device 120 via a system bus 130. The exemplary computing device 120 may comprise one, or more, data storage devices (one shown) 132, for example, a hard disk drive, a magnetic disk drive, an optical disk drive or other data storage device, for reading from and writing to a computer-readable media (one shown) 134, for example, a hard disk, an optical disk, a magnetic disk or other computer-readable media. The exemplary computing device 120 may also comprise an associated data-storage-device interface 136 for connecting the data storage device 132 to the system bus 130.

A digital-marking-surface application program may be stored on the read-only memory 124, on the random-access memory 126 or on the one, or more, data storage devices 132. The digital-marking-surface application program may comprise instructions that, when executed, may control the digital-marking-surface system 100, may process input from the digital marking surface 102, may effectuate changes in the content displayed on the digital marking surface 102 and may otherwise implement a digital-marking-surface application program.

The exemplary computing device 120 may comprise an input device 138, for example, a mouse, a keyboard, a joystick or other input device, which may be connected, to the system bus 130, via an interface 140, for example, a parallel port, game port, universal serial bus or other interface.

The exemplary computing device 120 may comprise a display 142, which may be connected via a video adapter 144.

The exemplary computing device 120 may be communicatively coupled with the digital-marking-surface system controller 104 via a network interface 146 or other communication connection.

Figure 2:
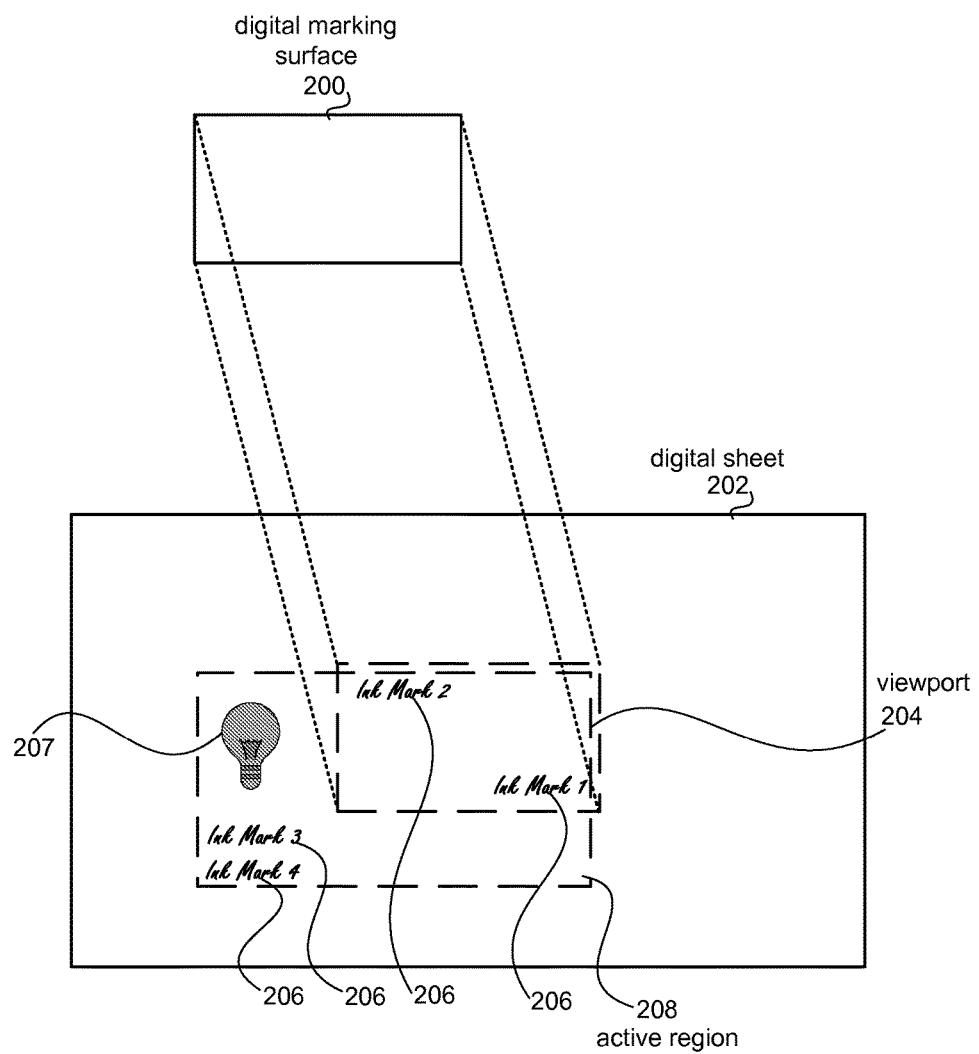
FIG. 2 is a diagram illustrating the relationship of a physical digital marking surface to a viewport and a digital sheet according to some embodiments of the present invention.

Some embodiments of the present invention may be understood in relation to FIG. 2. A digital marking surface 200, for example, an interactive whiteboard surface, touchscreen or other digital marking surface, may be associated with a digital sheet 202. The digital sheet 202 may correspond to a larger spatial region than the physical apparatus 200. The digital sheet 202 conceptually may be considered of infinite extent, but for implementation and practical purpose may be of finite extent, wherein the finite extent may be larger than the physical-apparatus extent in the horizontal and/or the vertical direction. In some embodiments of the present invention, the digital sheet 202 may be three times the dimension of the physical apparatus extent in both the horizontal direction and the vertical direction. The region of the digital sheet 202 that is currently viewable on the physical apparatus 200 may be referred to as the viewport 204. The region 208 of the digital sheet 202 that contains digital ink marks 206 and other digital content 207 may be referred to as the active region 208.

Figure 3:
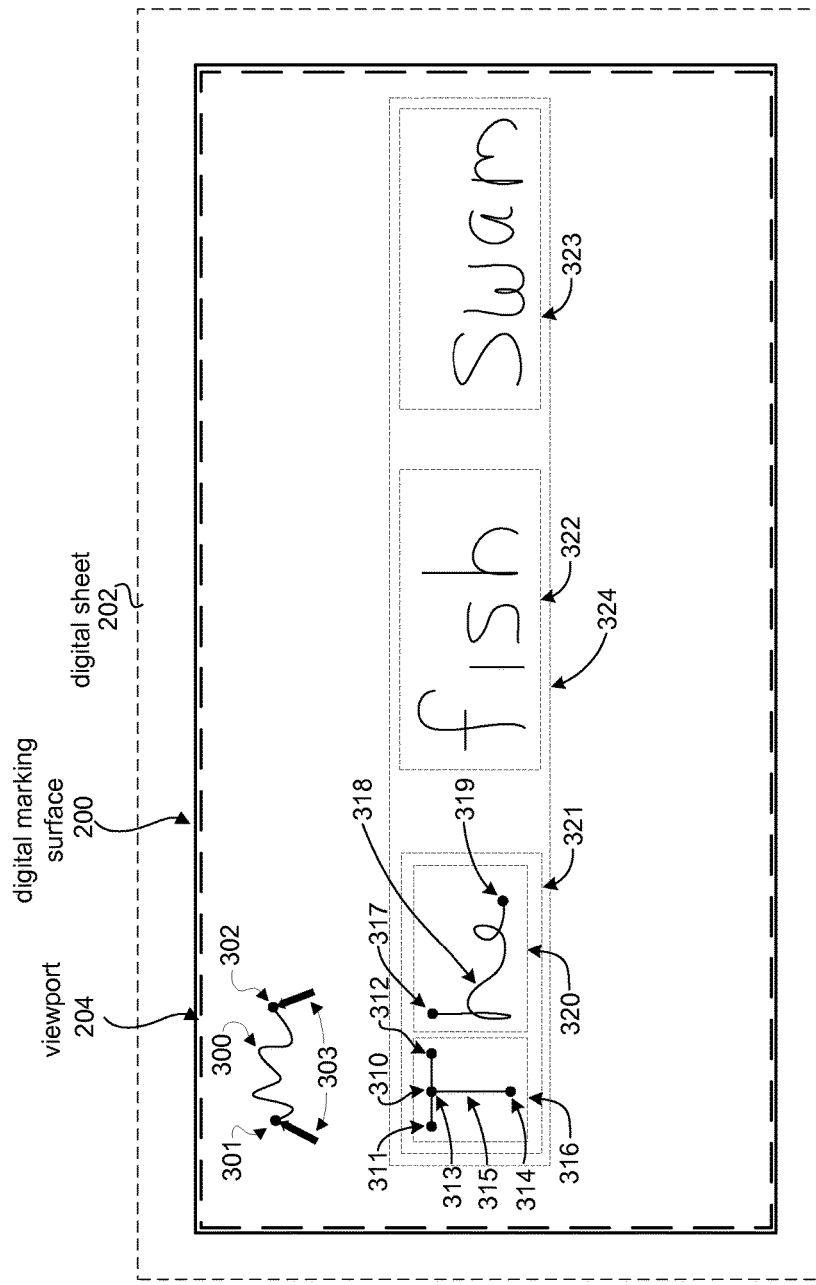
FIG. 3 is a diagram illustrating the relationship between digital marks and content units according to some embodiments of the present invention.

Some embodiments of the present invention may be understood in relation to FIG. 3. FIG. 3 depicts a digital-marking-surface system 100 comprising a digital marking surface 200. During use, a user may create a mark 300 with "digital ink" on the digital marking surface 200. Typically, a user will use a pen, stylus, finger or other digital marking device 303 to activate sensors that locate the digital marking device 303 relative to the digital marking surface 200 and place a mark 300 on the digital marking surface at the location of the digital marking device 303. A digital marking device 303 may comprise electronics or other components to enhance or enable detection, however, in some embodiments, a digital marking device 303 may simply be a user's finger or a dumb stylus. A digital marking device 303 may be anything used to make a digital mark on the digital marking surface 200.

Sensors of the digital-marking-surface system 100 may detect the digital marking device 303 when the digital marking device 303 makes contact with the digital marking surface 200. This may be referred to as a "pen-down" action 301. Sensors of the digital-marking-surface system 100 may also detect a location at which the digital marking device 303 leaves contact with the digital marking surface 200. This may be referred to as a "pen-up" action 302. The motion of the digital marking device 303 along the digital marking surface 200 between a pen-down action 301 and a pen-up action 302 may be used to define a digital mark 300. A digital mark 300 may take any shape and may relate to handwriting symbols, graphics or other marks. In typical use, digital marks will define alphanumeric characters and diagrammatical elements.

The digital-marking-surface system controller 104 or a connected computing device 120 may be used to identify digital marks through system sensors as they are input and to convert sensor input into an image of the digital mark displayed on the digital marking surface 200. Accordingly, as a user writes with a digital marking device 303 on the digital marking surface 200, a digital mark 300 appears on the digital marking surface 200 at the location of the digital marking device 303. When a digital mark is converted to an image displayed on the digital marking surface 200, that image of the mark may be referred to as a basic ink unit.

The digital-marking-surface system controller 104 or a connected computing device 120 may also function to aggregate basic ink units into compound ink units. A plurality of basic ink units may be aggregated into a single compound ink unit. For example, a series of handwritten characters may be aggregated into a word represented by a compound ink unit. As another example, a series of words represented by basic or compound ink units may be aggregated into another compound ink unit corresponding to a sentence or paragraph. Aggregation of ink units may be based on geometric relationships, semantic relationships and other relationships.

With further reference to FIG. 3, a user may place a mark by a pen-down action at a first location 311 followed by a horizontal stroke and pen-up action at a second location 312, In response, digital-marking-surface system controller 104 or a connected computing device 120 draws a first basic ink unit 310 between the first location 311 and the second location 312. The system 104, 120 may then analyze first basic ink unit 310 to determine whether it conforms to any known character, symbol or predefined diagrammatic gesture description, also considered an ink gesture. If first basic ink unit 310 does not conform to any predefined diagrammatic gesture description, it may be left as a basic ink unit. The user may then place another mark on digital marking surface 200 with a pen-down action at a third location 313 followed by a stroke and a pen-up action at a fourth location 314. The system 104, 120 converts this mark into a second basic ink unit 315 displayed on the surface. The system 104, 120 then analyzes second basic ink unit and any other basic ink units proximate to second basic ink unit. In this example, first basic ink unit is proximate to second basic ink unit so first and second basic ink units are analyzed together to determine whether, together, they conform to a known description. In this case, the basic ink units are recognized as the letter "T" and are combined as a compound ink unit 316 comprising the alphanumeric character "T." The user may then make another mark 318 with a pen-down action at a fifth location 317, a cursive stroke and a pen-up action at a sixth location 319. The digital-marking-surface system controller 104 or a connected computing device 120 may convert this action into a basic ink unit 320. This third basic ink unit may be analyzed and converted to a compound ink unit with the characters "h" and "e." Because of the proximity and orientation of third basic ink unit 320 and compound ink unit 316, this combination of ink units may be analyzed and another compound ink unit 321 may be created to represent the word "The." Similar processes may be used to create compound ink units 322, 323. Compound ink units may be further analyzed to determine further relationships. In this example, compound ink units 321-323 may be analyzed and found to constitute a sentence based on character recognition, grammatical rules and other relationships. Another compound ink unit 324 may be created to represent this sentence. Basic and compound ink units may be generated for strokes, characters, shapes, images and other diagrammatical objects and marks.

Some embodiments of the present invention may use Microsoft's Windows Presentation Foundation (WPF). WPF comprises a resolution-independent, vector-based rendering engine that works in conjunction with digital-marking-surface system controller 104 or a connected computing device 120. Some embodiments may use Extensible Application Markup Language (XAML) markup along with managed programming language code stored on and implemented by digital-marking-surface system controller 104 or a connected computing device 120.

Figure 4A:
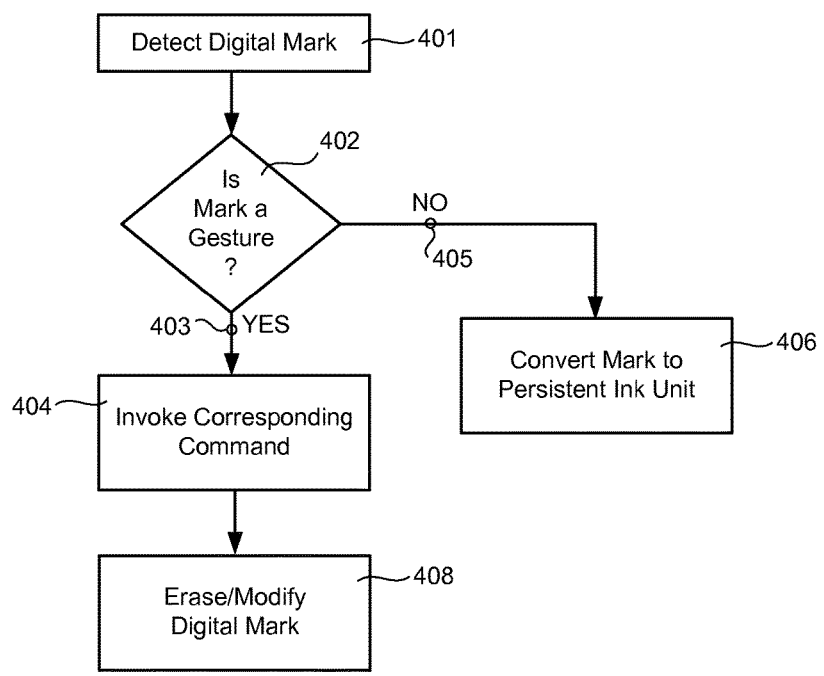
FIG. 4A is a flow chart illustrating embodiments of the present invention comprising predetermined diagrammatic gesture recognition.

Some embodiments of the present invention may be described with reference to FIG. 4A. In these embodiments, some movements of the digital marking device 303 on or proximate to the digital marking surface 200 may be associated with a system command and may serve to activate that command when detected by the system. In these embodiments, when a digital mark is detected 401, the digital mark may be analyzed to see if it substantially matches a predetermined diagrammatic gesture 402. If the digital mark matches 403 the diagrammatic gesture, an associated command may be performed 404. This function may be effectuated by maintaining a list of predetermined diagrammatic gestures which are compared to digital marks as they are detected by the system. When a digital mark matches a predetermined diagrammatic gesture, a command function associated with the diagrammatic gesture may be invoked 404. A digital mark matching a predetermined diagrammatic gesture may be erased or modified 408 to indicate recognition, to prompt further input or simply to clean up the display. When a digital mark does not match 405 a predetermined diagrammatic gesture, the digital mark may be converted 406 to a persistent ink unit and may remain displayed on the digital marking surface 200.

Figure 4B:
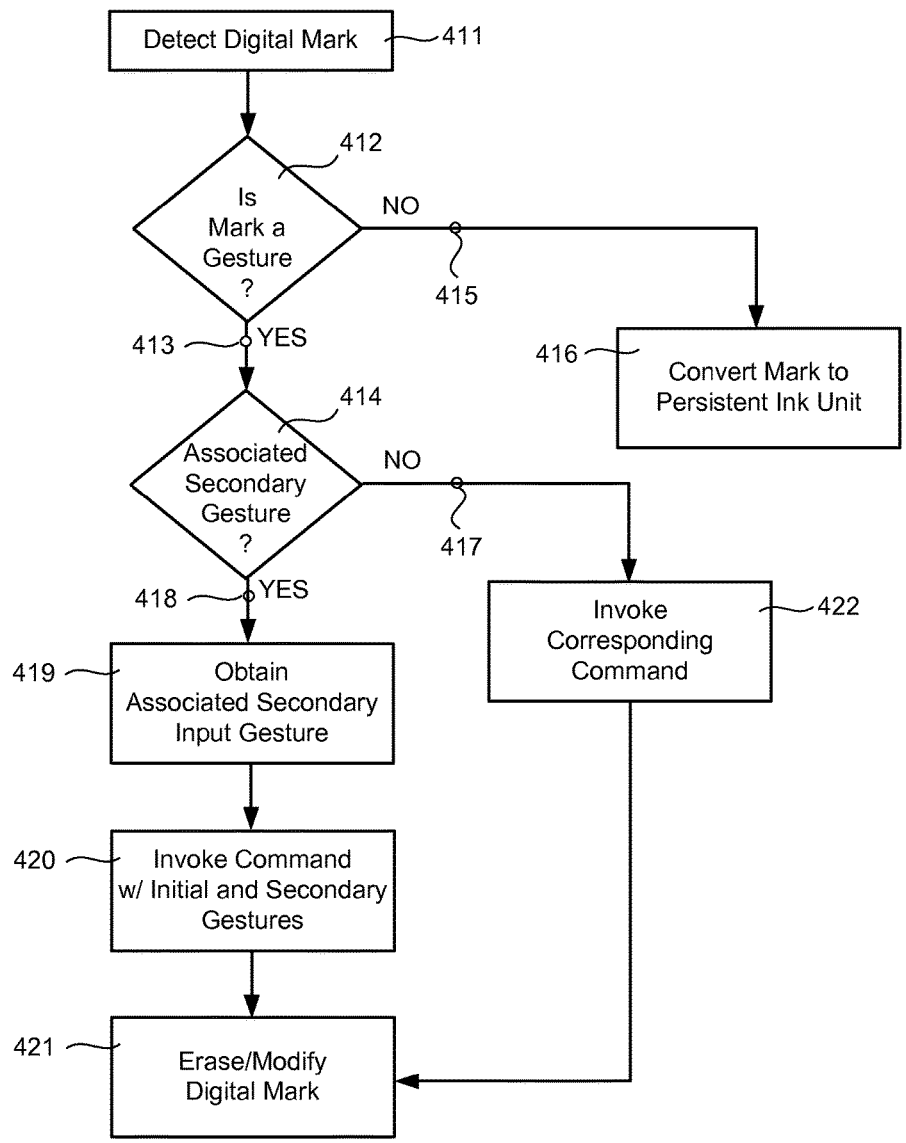
FIG. 4B is a flow chart illustrating embodiments of the present invention comprising predetermined diagrammatic gesture recognition with an associated secondary gesture.

Some embodiments of the present invention may be described with reference to FIG. 4B. In these embodiments, some movements of one or more digital marking devices 303 on or proximate to the digital marking surface 200 may be associated with a system command and may serve to activate that command when detected by the system. In these embodiments, when a digital mark is detected 411, the digital mark may be analyzed to see if it substantially matches a predetermined diagrammatic gesture 412. If the digital mark matches 413 a diagrammatic gesture, the diagrammatic gesture may be analyzed to determine whether an associated secondary gesture is associated 414 with that diagrammatic gesture. If an associated secondary gesture exists 418, additional gesture input may be received 419 and used to invoke and implement 420 the associated command. For example, a first gesture may indicate a specific command selection and an associated secondary gesture may indicate the extent to which the command is to be performed. Once one or more associated gestures are recognized 412, 414, 419, the associated digital marks may be modified or erased 421 to indicate recognition, to prompt further input or simply to clean up the display.

These multi-gesture functions may be effectuated by maintaining a list of predetermined diagrammatic gestures which are compared to digital marks as they are detected by the system. When a digital mark matches a predetermined diagrammatic gesture, a list may be referenced to determine whether an associated secondary gesture is associated with the initial diagrammatic gesture. If no associated secondary gesture is associated with the initial diagrammatic gesture 417, a command function associated with the initial diagrammatic gesture may be invoked 422. When a digital mark does not match 415 a predetermined diagrammatic gesture, the digital mark may be converted 416 to a persistent ink unit and may remain displayed on the digital marking surface 200.

In some embodiments, invocation of a command or function may comprise display of a menu to prompt for further input relative to the command. In some embodiments, a secondary gesture may be related to a displayed menu or to another item displayed on the digital marking surface 200.

Figure 5:
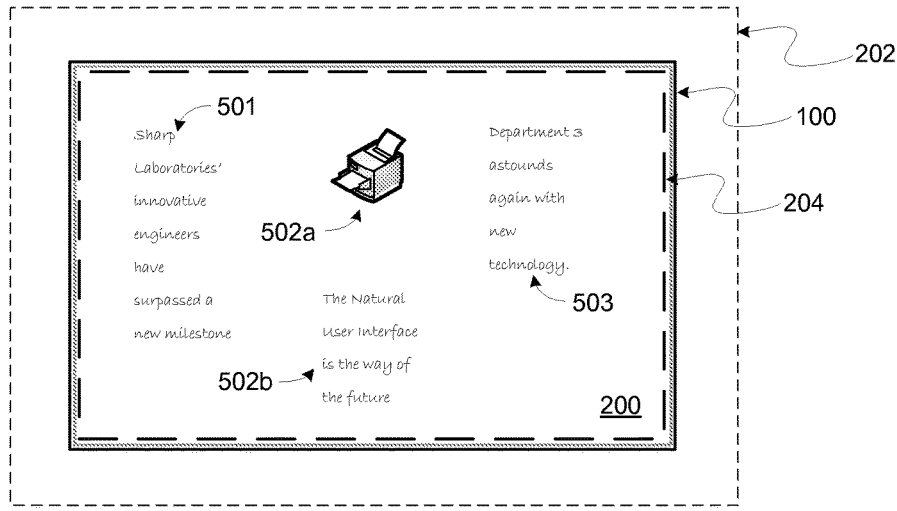
FIG. 5 is a diagram illustrating an exemplary digital marking surface with content units accumulated thereon.

During use, a digital marking surface 200 accretes digital content units 501, 502 and 503 as illustrated in FIG. 5. This accretion may occur until the usable space in the viewport 204 is substantially filled with content units 501, 502 and 503. With a typical digital whiteboard or touch-screen that does not benefit from embodiments of the present invention, when the viewport is filled, content units must be erased, or otherwise removed, for example, a video window may be closed, before additional content units may be placed on the digital marking surface. This removal causes loss of information and continuity in a presentation. However, with digital marking surfaces of embodiments of the present invention, content units on the digital marking surface may be rearranged to make space for new content units. In these embodiments, a user may indicate an expansion mark on the digital marking surface and further indicate a direction and/or extent for the expansion of surface space, also referred to as white-space generation. When these gestures are performed, a content unit on the digital marking surface 200 that is bisected by the expansion mark may be divided at, or near, the expansion mark into smaller constituents, of which a first plurality may be moved to one side of the expansion mark and a second plurality may be moved to the other side of the expansion mark, or may be moved, in its entirety, to one side of the expansion mark, and a content unit on either side of the expansion mark may be spatially translated away from the expansion mark, thereby creating blank space on the digital marking surface.

Figure 6:
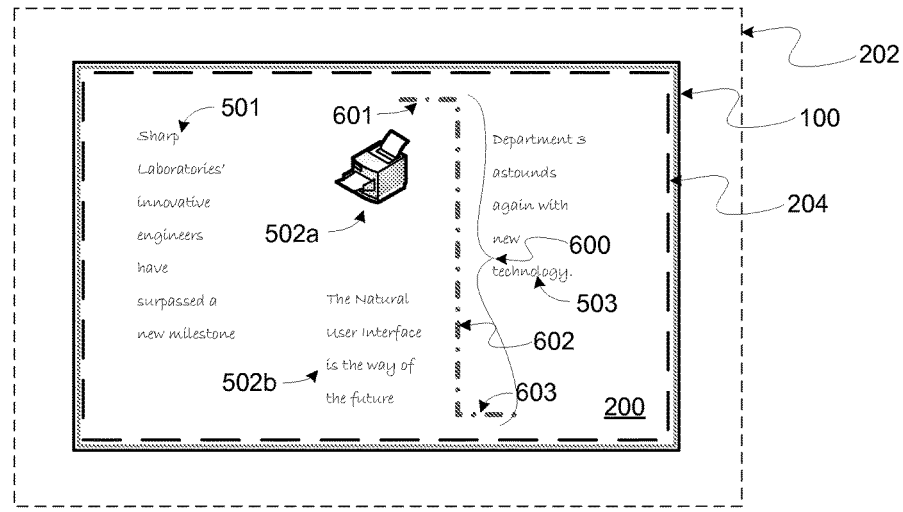
FIG. 6 is a diagram illustrating a digital marking surface with content units and a rift gesture according to exemplary embodiments of the present invention.

Some embodiments of the present invention may be described with reference to FIG. 6, which illustrates a digital marking surface 200, digital sheet 202 and viewport 204 along with digital content units 501-503. In this exemplary embodiment, the digital marking surface 200 may be substantially filled with content units or additional space may be available. If a user wishes to create additional space between content units 502 and content units 503, the user marks a rift gesture 600 by initially marking a head mark 601 followed by a rift designation mark 602 and a tail mark 603. In some embodiments, the head mark 601 and tail mark 603 are substantially perpendicular to the rift designation mark 602 and extend outwardly in opposite directions. When the rift gesture 600 is marked on the digital marking surface 200, the rift gesture 600 may be recognized as a predetermined diagrammatic gesture and is, therefore, processed differently than an ink unit. Instead, the rift gesture 600 may be interpreted as a command invoking an associated command function. In this case, the command function separates content units on either side of the rift designation mark 602, by spatial translation or other separation techniques, to an extent that may be defined by the user.

Figure 7:
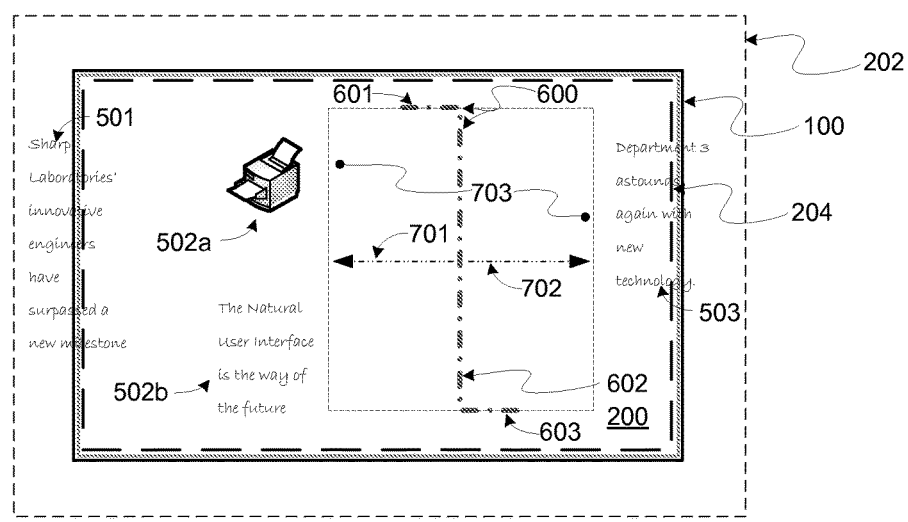
FIG. 7 is a diagram illustrating an exemplary digital marking surface, whereon horizontal spatial separation of content units has occurred in response to a rift gesture according to exemplary embodiments of the present invention.

This content unit separation may be described with reference to FIG. 7. When rift gesture 600 is marked and recognized by the system, content units 502 are moved 701 to the left and content units 503 are moved to the right 702. This movement creates blank space 703 on the digital marking surface proximal to the location of the rift gesture 600. In some cases, content units may be moved within the viewport 204, such as content units 502. In some cases, content units may be moved out of the viewport 204 onto a part of the digital sheet 202 existing out of the viewport 204. This is the case for content units 503 in this exemplary scenario.

In some embodiments, the length of head mark 601 and/or tail mark 603 may indicate the extent of the desired separation from the rift designation mark 602. In these embodiments, content units, or parts thereof, to the left of the rift designation mark 602 may be moved to the left by a distance proportional to the length of the head mark 601. Likewise, content units, or parts thereof, to the right of the rift designation mark 602 may be moved to the right by a distance proportional to the length of the tail mark 603. In other embodiments, content-unit movement on either side of the rift designation mark 602 may be related to the minimum, maximum, average or some other relationship of the head mark 601 and the tail mark 603.

In some embodiments, the extent of separation of the content units may not be related to any part of the head mark 601, rift designation mark 602 or tail mark 603. In some of these embodiments, the extent of separation of content units may be indicated by an associated secondary separation-extent diagrammatic or touch gesture in conjunction with a diagrammatic rift gesture 600. An associated secondary gesture, such as a separation-extent gesture, may follow a diagrammatic rift gesture 600. In some embodiments, the separation-extent gesture may be a diagrammatic mark substantially perpendicular to the rift gesture 600 wherein the length of the separation-extent gesture may indicate the extent of the content unit separation. In an alternative exemplary embodiment, the diagrammatic rift gesture 600 may be followed by an associated secondary gesture, such as a two-point spread touch gesture in which two simultaneous points of contact are established on the digital marking surface 200 and then spread apart to indicate an extent of separation, For example, a user may place two fingers on the digital marking surface 200 and then spread the two fingers apart while maintaining contact with the digital marking surface 200. The difference between the initial distance between the two fingers and the final distance between the fingers before they lose contact with the digital marking surface 200 may be proportional to the extent of separation of the content units.

Figure 8A:
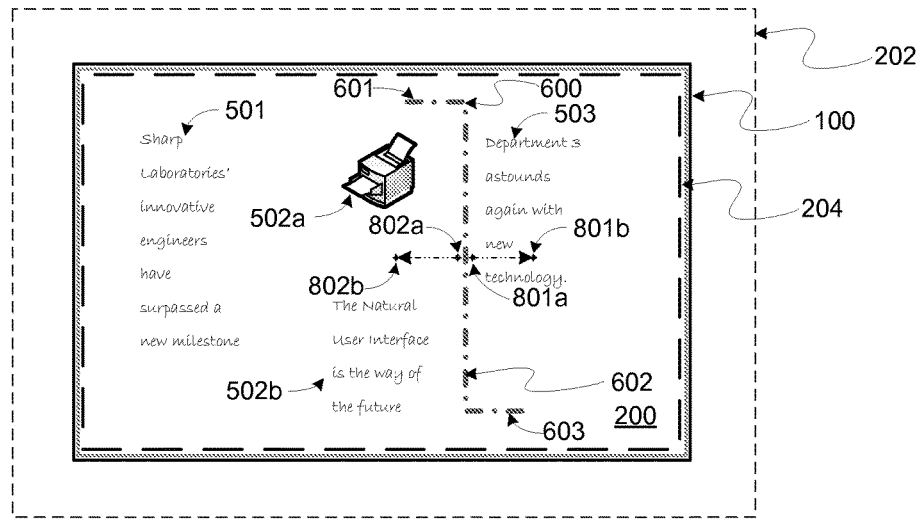
FIG. 8A is a diagram illustrating a digital marking surface with content units, a rift gesture and an extent gesture shown according to exemplary embodiments of the present invention.
Figure 8B:
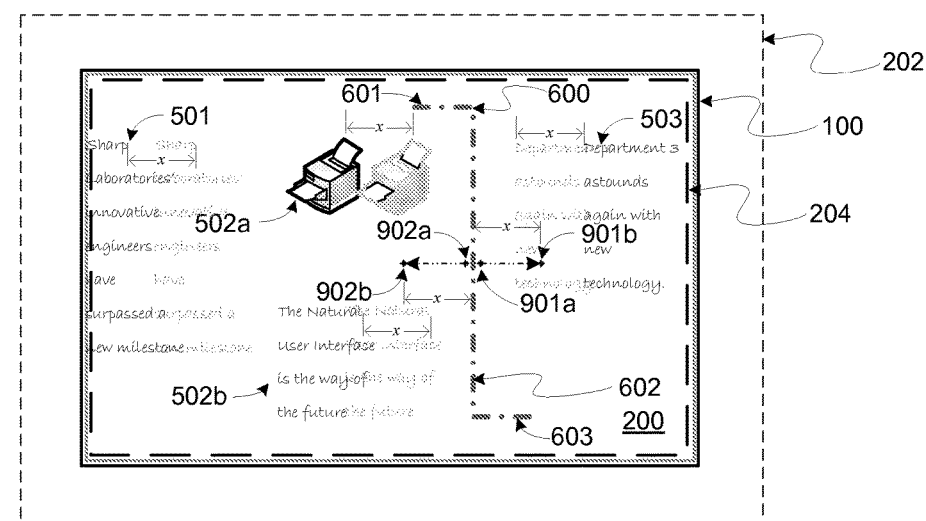
FIG. 8B is a diagram illustrating a digital marking surface wherein horizontal spatial separation of content units has occurred in response to a rift gesture and an extent gesture according to exemplary embodiments of the present invention.

As illustrated in FIGS. 8A and 8B, two fingers, styli or similar digital marking devices make contact with or become proximate to the digital marking surface 200 at points 801a and 802a. While maintaining contact with or proximity to the digital marking surface 200, the user moves the two digital marking devices away from each other to points 801b and 802b thereby indicating a distance x to move the content units. The digital marking system may then use the distance x as a basis for content unit movement and creation of blank space in the viewport 204.

In some embodiments, the length of the rift designation mark 602 may designate the extent of content unit separation in the direction parallel with the rift designation mark 602. For example, if the rift designation mark is vertical, content units above the head mark 601 and below the tail mark 603 may not be moved or separated and, if the rift designation mark 602 is horizontal and the head mark 601 is on the left side, content units to the left of the head mark and to the right of the tail mark may not be move or separated.

In some embodiments, head mark 601 and/or tail mark 603 may be drawn in a specific shape, such as a circle, to indicate that the separation of content units extends, in the direction parallel to the rift designation mark 602, to the extent of the digital sheet 202. That is, the rift designation mark 602 will be assumed to extend to the limits of the digital sheet 202 and any content units on either side of the rift designation mark 602 and its extensions will be separated by execution of the associated command. In some embodiments, the shape of head mark 601 and/or tail mark 603 may indicate that separation of content units extends to the extent of the viewport 204. That is, the rift designation mark 602 is assumed to extend to the limits of the viewport 204 and content units in the viewport on either side of the rift designation mark 602 and its extensions within the viewport 204 will be separated by execution of the associated command. In some embodiments, only content units between the drawn head mark 601 and tail mark 603 will be affected by the separation command. In still other embodiments, the rift designation mark 602 may be assumed to extend to other limits based on user input, digital sheet content units or other parameters. For example, the ends of the rift designation mark 602 may be assumed to extend until they make contact with content units or another boundary.

In some embodiments, the rift gesture 600 may comprise a stepped rift designation mark that steps around content units in substantially perpendicular steps to indicate the location from which separation will occur.

It should be noted that, in some embodiments, the rift designation mark 602 may be configured to operate at any angle drawn by the user or may be configured to snap to specified angles or may be restricted to predefined directions, for example, to a horizontal and a vertical direction. Generally, the direction of separation of content units may be substantially perpendicular to the axis of the rift designation mark 602, but, in some embodiments, may be modified by user input. Accordingly, vertical separation may be performed similarly to the exemplary horizontal content unit separation shown in the above exemplary description and, likewise, content unit separation at any given angle may be performed.

Figure 9A:
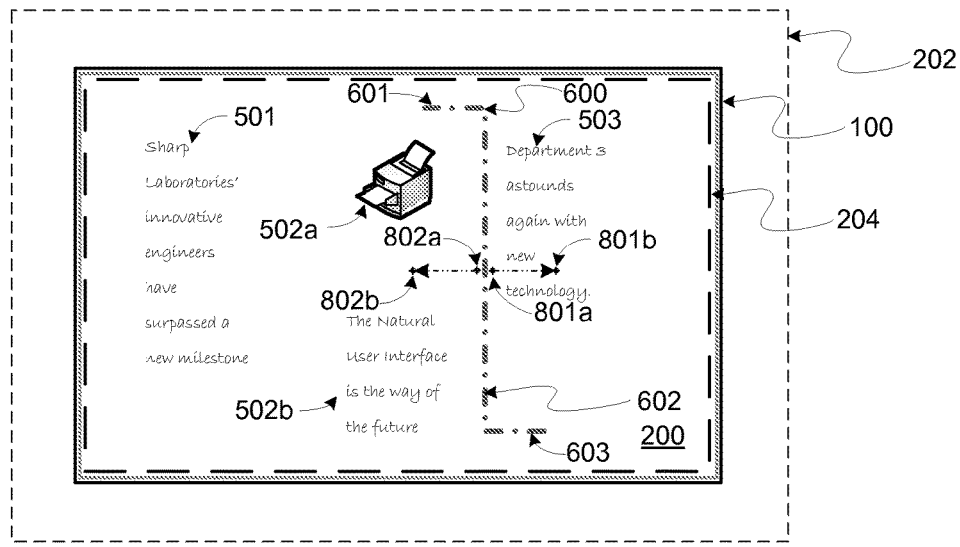
FIG. 9A is a diagram illustrating a digital marking surface with content units, a rift gesture and an extent gesture shown according to exemplary embodiments of the present invention.
Figure 9B:
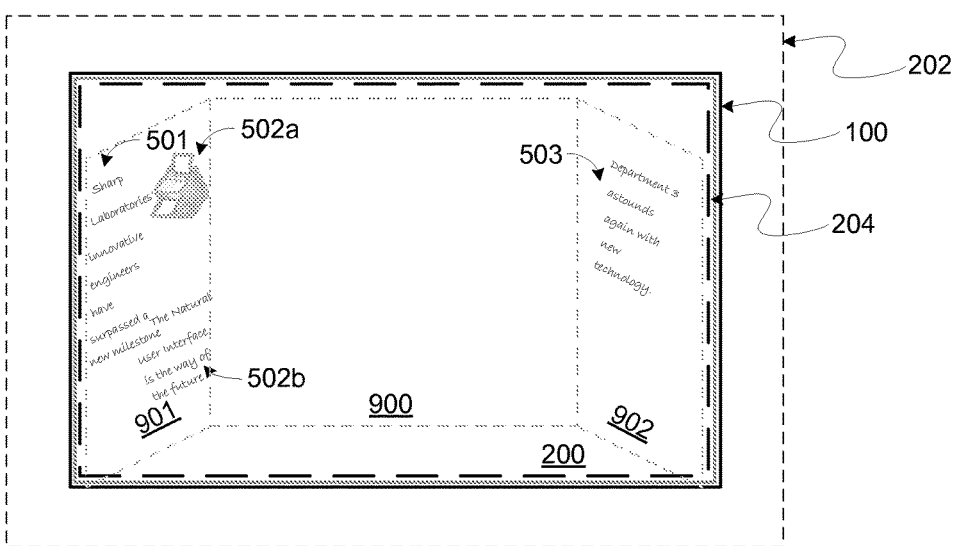
FIG. 9B is a diagram illustrating a digital marking surface wherein horizontal spatial separation of content units has occurred in response to a rift gesture and an extent gesture and a transformed view of spatially separated content units is displayed according to exemplary embodiments of the present invention.

Some embodiments of the present invention, illustrated in FIGS. 9A and 9B, may display a transformed view of separated content units. A transformed view may comprise a view of content units that are distorted, warped, stretched, compressed, angled, shaded or otherwise transformed or modified in appearance. In some embodiments, the view modification may be relative to a view panel or viewport boundary. A transformed view, in some embodiments, may comprise a perspective view. In these exemplary embodiments shown in FIGS. 9A and 9B, content units 501, 502a, 502b and 503 have accumulated on the digital marking surface 200. A user then draws a rift gesture 600 recognized by the system indicating that the user desires to create blank space at the rift gesture 600 location on the digital marking surface 200. A user may also draw an associated secondary gesture, such as an extent gesture 802a, 802b subsequent to the rift gesture or in combination therewith. In response to the rift gesture/secondary extent-gesture input, the digital-marking-surface system controller 104 or a connected computing device 120 may convert content units on either side of the rift gesture into a transformed view as shown in FIG. 9B. As shown, in some embodiments, content units 501, 502 to the left of the rift gesture 600 may be translated to the left and displayed in a transformed view similar to a three-panel storyboard with virtual side panels 901, 902 at angles to the virtual center panel 900. In some embodiments, content units displayed in the virtual side panels may be displayed at an angle to simulate the perspective of a side panel. Content units displayed in the virtual side panels 901, 902 may also be spatially compressed to a smaller display size to make room in the viewport 204 for the blank space desired by the user. In some embodiments, the display angle of the content units displayed in the virtual side panels 901, 902 may not be changed, but the content units may be transformed, morphed or compressed to a smaller size.

Although content units 501, 502, 503 are displayed as being distorted in the compressed, transformed view, they are actually spatially translated onto parts of the digital sheet 202 outside the center virtual panel 900 and may be dragged back into the viewport or virtual center panel 900 with another user gesture. In some embodiments, while in the transformed view, a user may employ a predetermined diagrammatic gesture to pan the viewport 204 or virtual center panel 900 over the digital sheet 202 to bring content units outside the viewport 204 or virtual center panel 900 into the viewport 204 or virtual center panel 900. In these embodiments, content units coming into the viewport 204 or virtual center panel 900 from the sides will first enter the transformed-view virtual side panels 901, 902 and be displayed in a transformed view. Content units entering the center panel 900 will then be displayed in a normal perspective and size without morphing or transformation effects. At any time, the user may turn off the transformed view and the parts of the content units remaining in the viewport 204 may be displayed at their actual locations and those parts of content units spatially translated out of the viewport 204 by the rift expansion function may not be displayed.

In some embodiments comprising a transformed view, such as a view with transformed side panels 901 and 903, addition of ink units by user input on the digital marking surface 200 or other content units at the location of the transformed view (for example, side panels 901 and 903) may cause the transformed view to automatically revert to a normal, non-transformed view upon input of the new ink units or other content units, After this new input is complete, the view may automatically lapse back to the transformed view showing the new content units in the transformed view or the view may remain in the normal, non-transformed format.

Some embodiments of the present invention may use a two-dimensional blank-space creation function in which content units may be moved in two dimensions away from an initial gesture location. In these embodiments, a user may make a diagrammatic gesture in a recognizable pattern and may indicate the extent of content-unit spatial separation function. The digital-marking-surface system controller 104 or a connected computing device 120 may then recognize the gesture and move content units outward from the gesture location to a distance indicated by the indication of content-unit spatial separation function.

Figure 10A:
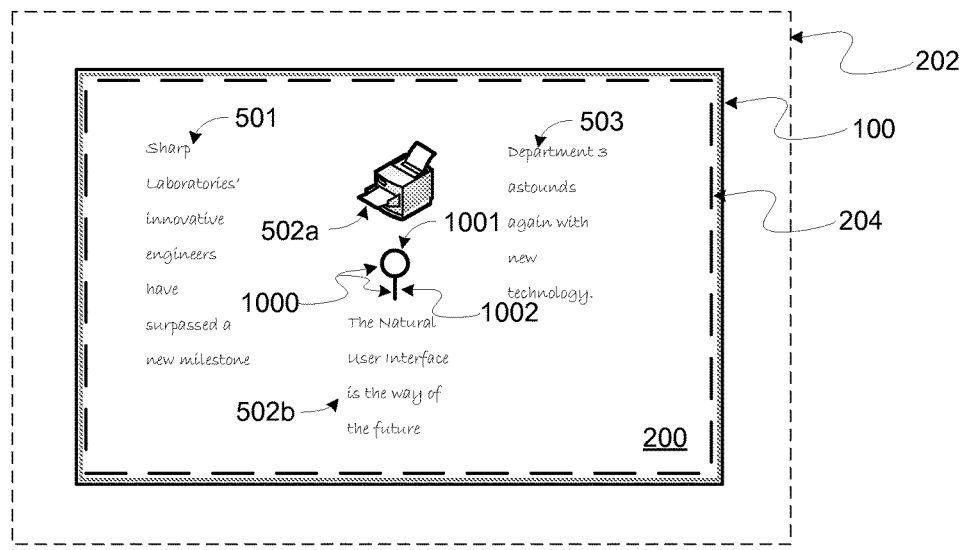
FIG. 10A is a diagram illustrating a digital marking surface with content units and a keyhole gesture shown according to exemplary embodiments of the present invention.
Figure 10B:
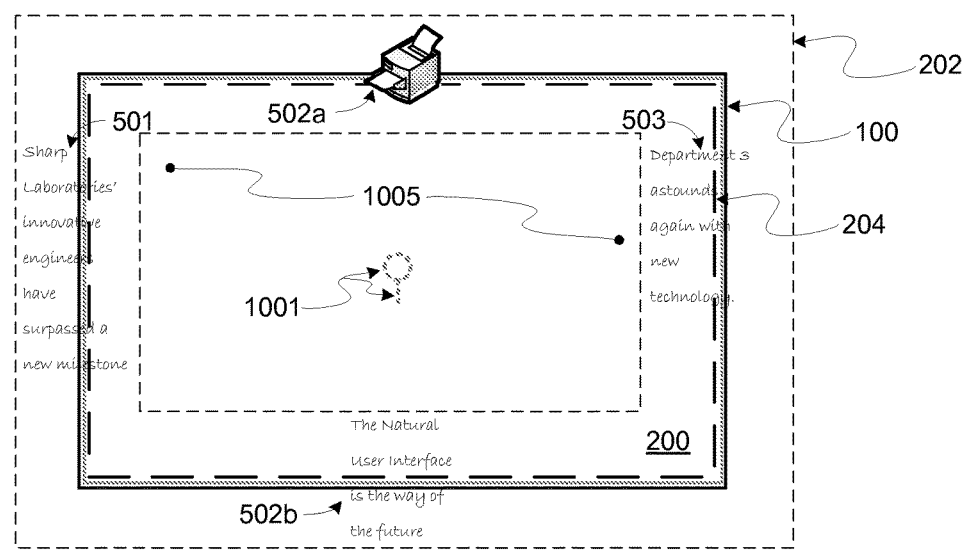
FIG. 10B is a diagram illustrating a digital marking surface with content units spatially separated in two dimensions in response to a keyhole gesture according to exemplary embodiments of the present invention.

In an exemplary embodiment illustrated in FIGS. 10A and 10B, content units 501-503 have accumulated on the digital marking surface 200. A user then desires more space between digital-image content unit 502a and the content units below 502b and also desires that content units 501 and 503 be spread out horizontally. To accomplish this task, the user marks a "keyhole" gesture 1000, which may comprise a circular point designation 1001 and a keyhole tail mark 1002 or other gestural components. The keyhole gesture 1000 is recognized by the digital-marking-surface system controller 104 or a connected computing device 120 as a predetermined diagrammatic gesture associated with a control function. Any point on the keyhole gesture 1000 may be assigned as a "center of expansion" from which content units may be moved. In an exemplary embodiment, the center of circular point designation 1001 may be assigned as the center of expansion. In some embodiments, content units may be moved approximately radially outward from the center of expansion. In other embodiments, content units may be moved orthogonally such that content units above the center of expansion may be moved upward, content units below the center of expansion may be moved downward, content units to the right of the center of expansion may be moved to the right and content units to the left of the center of expansion may be moved to the left.

A part of the keyhole gesture 1000 may also be used to indicate an extent of expansion. For example, the length of the keyhole tail mark 1002 may be proportional to the extent of expansion to which content units will be moved.

When the digital-marking-surface system controller 104 or a connected computing device 120 recognizes the keyhole mark gesture, the system controller 106 may move the content units on the digital sheet outwardly from the keyhole mark as described above. FIG. 10B shows an example of new blank space 1005 created by this process. In the process, the controller system 106 may move digital-image content unit 502a upwardly to a new position, may move content units 502b downwardly to a new position, may move content units 501 to the left and may move content units 503 to the right, thereby creating new blank space 1005.

In some embodiments, the extent of separation of the content units may not be related to any part of the keyhole gesture 1000. In some of these embodiments, the extent of separation of content units may be indicated by an associated secondary gesture such as a diagrammatic or touch gesture in conjunction with a diagrammatic keyhole gesture 1000. An associated secondary separation-extent gesture may follow the keyhole gesture 1000. The separation-extent gesture may be a mark radiating outwardly from the keyhole gesture 1000, wherein the length of the separation-extent gesture may indicate the extent of the content-unit spatial separation function. In an exemplary embodiment, a keyhole gesture 1000 may be followed by an associated secondary two-point-spread touch gesture in which two simultaneous points of contact may be established on the digital marking surface 200 and then spread apart to indicate an extent of separation. For example, a user may place two fingers on the digital marking surface 200 and then spread the two fingers apart white maintaining contact with the digital marking surface 200. The difference between the initial distance between the two fingers and the final distance between the lingers before they lose contact with the digital marking surface 200 may be proportional to the extent of separation of the content units.

In some embodiments, illustrated with reference to FIGS. 11A and 11B, use of the keyhole gesture 1000 or a related diagrammatic gesture may invoke a transformed view of the spatially displaced content units. In these embodiments, content units 501, 502, 503 may have accumulated on the digital marking surface 202 and a user may mark a keyhole gesture 1000 on the digital marking surface 202 below image content unit 502a. In response to the keyhole gesture 1000, digital-marking-surface system controller 104 or a connected computing device 120 invokes a transformed view to display content units displaced by the operation. In an exemplary embodiment illustrated in FIG. 11B, the digital marking surface 202 displays the newly-created blank space in a main center panel 1100 shown in normal, non-transformed view. However, content units along the perimeter of the new blank space may be displayed in virtual box panels 1101-1104, which simulate the view of the interior of a rectangular box or cube. Content units, for example, content unit 502b, which were below the keyhole gesture center of expansion, may be displayed in virtual box panel 1101, which simulates the view of the floor of a box or cube. Content units, for example, content units 503, which were to the right of the keyhole gesture center of expansion, may be displayed in virtual box panel 1102 simulating the right wall of a box interior. Content units, for example, content units 502a, which were above the keyhole gesture center of expansion, may be displayed in virtual box panel 1103 simulating the ceiling of a box interior. Content units, for example, content units 501, which were to the left of the keyhole gesture center of expansion, may be displayed in virtual box panel 1104 simulating the left wall of a box interior.

In some embodiments, content units 501, 502a, 502b and 503 displayed in box panels 1101-1104 may be displayed in a transformed view wherein the angles of displayed objects are changed to show perspective. Content units 501, 502a, 502b and 503 displayed in virtual box panels 1101-1104 displayed in a transformed view may also be compressed spatially to make room for the blank space in the main panel 1100 desired by the user.

In some embodiments, content unit spatial translation or separation may be performed in real time with an associated secondary separation-extent gesture. In these embodiments, the digital-marking-surface system controller 104 or a connected computing device 120 may move content units on the digital marking surface 202 while the user is performing the separation-extent gesture. As this occurs, the user may trace or spread fingers, styli, etc. apart until the content units are located in the desired position.

When a rift line, keyhole shape or other diagrammatic gesture mark indicative of an intention to create space, intersects a content unit, a determination may be made regarding whether the context unit should be placed on one side of the mark or the other. In some cases, compound ink units may be split into smaller compound ink units or basic ink units. In some embodiments, a basic or compound ink unit bisected by a gesture mark may be analyzed to determine if it is part of a larger compound ink unit. If it is part of a larger compound ink unit, that larger compound ink unit may be analyzed to determine whether the majority of its area, characters or other characteristic are on a given side of the gesture mark. If the majority of the characteristic is on one side of the gesture mark, the entirety of the larger compound ink unit may be considered on that side of the gesture mark for content unit separation or spatial translation purposes.

In some embodiments, a user may define a content-unit spatial separation function criterion. In some embodiments, a user may adjust settings to tell controller system 106 whether, or not, to separate content units by content-unit type and level. For example, a user may indicate that sentence, image and graphical ink units may not be separated, but that paragraph ink units may be split into sentence ink units.

In some embodiments of the present invention, a content unit may comprise a separation attribute, the value of which may indicate whether, or not, the content unit may be split in response to a white-space generation request, for example, in response to a rift or keyhole gesture. For example, the value of the separation attribute associated with a content unit corresponding to a video window may be set to indicate the content unit must be moved as a single entity in a white-space generation request. Whereas, the value of the separation attribute associated with a content unit corresponding to digital ink marks may be set to indicate that the content unit may be split in a white-space generation request.

In some embodiments of the present invention, a content unit may comprise a semantic tag. In some of these embodiments, during a spatial separation operation in response to a white-space generation request, a plurality of content units may be separated so as to keep content units with similar semantic tags spatially grouped together during the white-space generation process. In some embodiments, a semantic tag may be assigned to a content unit by a user. In alternative embodiments, a semantic tag may be assigned to a content unit in an automated process. For example, content units accreted in a list-like fashion may be assigned the same semantic tag.

In some embodiments of the present invention, the content of the current sheet may be saved, and the content of the current viewport may be copied to a blank sheet prior to performing a content unit spatial separation function. In these embodiments, the new sheet may be displayed, and the content unit spatial separation function may be performed on the new sheet containing the copied content.

The terms and expressions which have been employed in the foregoing specification are used therein as terms of description and not of limitation, and there is no intention in the use of such terms and expressions of excluding equivalence of the features shown and described or portions thereof, it being recognized that the scope of the invention is defined and limited only by the claims which follow.

What is claimed is:

1. A method, said method comprising:
   in a digital-marking-surface system:
   storing a rift predefined diagrammatic gesture description associated with a content-unit spatial separation function for creating a blank space on a digital marking surface, wherein said rift gesture description includes a head mark extending substantially perpendicular to a rift line, said rift line defining where content units on either side of the rift line are to be moved away from the rift line to create blank space, and a tail mark extending substantially perpendicular to the rift line in the opposite direction from the head mark;

detecting one or more digital marks on a digital marking surface;

analyzing said one or more digital marks to determine whether said one or more digital marks conform to said rift predefined diagrammatic gesture description; and performing said content-unit spatial separation function when said one or more digital marks conform to said rift predefined diagrammatic gesture description, wherein said content-unit spatial separation function comprises creating new blank space on said digital marking surface proximal to the rift line by moving content units away from the rift line;

wherein said predefined diagrammatic gesture description-describes a rift gesture.

2. A method as described in claim 1 further comprising converting said one or more digital marks to one or more ink units if said one or more digital marks do not conform to said predefined diagrammatic gesture description.

3. A method as described in claim 1, wherein lengths of said head and tail marks of said rift predefined diagrammatic gesture description indicate the extent the content units are moved away from the rift line.

4. A method as described in claim 1, wherein said content-unit spatial separation function causes separation of a plurality of content units away from said one or more digital marks.

5. A method as described in claim 1, wherein said content-unit spatial separation function causes separation of content units away from said one or more digital marks and display of said spatially separated content units in a transformed view.

6. A non-transitory, computer-readable medium comprising instructions instructing a processor in a digital-marking-surface system to:

store a rift predefined diagrammatic gesture description associated with a content-unit spatial separation function for creating a blank space on a digital marking surface, wherein said rift gesture description includes a head mark extending substantially perpendicular to a rift line, said rift line defining where content units on either side of the rift line are to be moved away from the rift line to create blank space, and a tail mark extending substantially perpendicular to the rift line in the opposite direction from the head mark in a memory;

detect one or more digital marks on a digital marking surface;

analyze said one or more digital marks to determine whether said one or more digital marks conforms to said predetermined rift description; and perform said content-unit spatial separation function when said one or more digital marks conforms to said rift predefined diagrammatic gesture description, wherein said content-unit spatial separation function comprises creating new blank space on said digital marking surface proximal to the rift line by moving content units away from the rift line;

wherein said predefined diagrammatic gesture description-describes a rift gesture.

7. A non-transitory, computer-readable medium as described in claim 6, wherein said content-unit spatial separation function causes separation of a plurality of content units away from said one or more digital marks.

8. A method, said method comprising:

in a digital-marking-surface system:

storing a rift gesture description associated with a content-unit spatial separation function for creating a blank space on a digital marking surface, wherein said rift gesture description describes a rift gesture comprising a rift designation mark extending substantially perpendicular to a rift line, said rift line defining where content units on either side of the rift line are to be moved away from the rift line to create blank space, and a tail mark extending substantially perpendicular to the rift line in the opposite direction from the rift designation mark;

detecting one or more digital marks on a digital marking surface;

analyzing said one or more digital marks to determine whether said one or more digital marks conforms to said rift gesture description; and performing said content-unit spatial separation function when said one or more digital marks conforms to a predefined diagrammatic gesture description, wherein said content-unit spatial separation function creates new blank space on said digital marking surface proximal to the rift line and causes spatial separation of a plurality of content units away from said one or more digital marks.

9. A method as described in claim 8, further comprising detecting a separation-extent gesture, wherein an extent of said spatial separation is defined by said separation-extent gesture.

10. A method as described in claim 8, wherein said content-unit spatial separation function further causes said plurality of spatially separated ink units to be displayed with a transformed view.

* * * * *